(12) United States Patent
Chien et al.

(10) Patent No.: US 11,669,515 B2
(45) Date of Patent: Jun. 6, 2023

(54) DATA ACCESS SYSTEM

(71) Applicant: AccelStor Technologies Ltd, Shanghai (CN)

(72) Inventors: Ting-Fang Chien, Shanghai (CN); Shih-Chiang Tsao, Shanghai (CN); Charles Tsai, Shanghai (CN)

(73) Assignee: ACCELSTOR TECHNOLOGIES LTD, China (Shanghai) Pilot Free Trade Zone (CN)

( * ) Notice: Subject to any disclaimer, the term of this patent is extended or adjusted under 35 U.S.C. 154(b) by 139 days.

(21) Appl. No.: 17/082,261

(22) Filed: Oct. 28, 2020

(65) Prior Publication Data

US 2022/0129444 A1    Apr. 28, 2022

(51) Int. Cl.
*G06F 16/23*    (2019.01)
*G06F 13/40*    (2006.01)

(52) U.S. Cl.
CPC ...... *G06F 16/2379* (2019.01); *G06F 13/4027* (2013.01)

(58) Field of Classification Search
CPC ... G06F 16/2379; G06F 13/4027; G06F 16/23
See application file for complete search history.

(56) References Cited

U.S. PATENT DOCUMENTS

| | | | |
|---|---|---|---|
| 9,256,542 B1 * | 2/2016 | Flower | G06F 12/0866 |
| 10,073,771 B2 | 9/2018 | Tsao et al. | |
| 10,235,087 B1 * | 3/2019 | Baruch | G06F 11/2097 |
| 10,503,645 B1 * | 12/2019 | Sandler | G06F 12/0868 |
| 2008/0005614 A1 * | 1/2008 | Lubbers | G06F 11/2092 714/11 |
| 2017/0228155 A1 * | 8/2017 | Shirota | G06F 3/0659 |
| 2017/0315725 A1 * | 11/2017 | McKean | G06F 12/0866 |
| 2019/0391890 A1 * | 12/2019 | Swamy | G06F 11/2089 |

\* cited by examiner

*Primary Examiner* — Robert W Beausoliel, Jr.
*Assistant Examiner* — Mohammad S Bhuyan
(74) *Attorney, Agent, or Firm* — McClure, Qualey & Rodack, LLP (57) ABSTRACT

A data access system includes: a data storage medium, a record medium, a first controller, and a second controller. The record medium includes a first record area and a second record area. The first controller includes a first metadata area. The second controller includes a second metadata area. The first controller is connected to the data storage medium and the record medium and corresponds to the first record area. The second controller is connected to the data storage medium and the record medium and corresponds to the second record area. The first controller receives first data, and writes the first data into the data storage medium in a log manner to update the first metadata area, and correspondingly generates a first record in the first record area. The second controller updates the second metadata area according to the first record in the first record area.

7 Claims, 3 Drawing Sheets

DATA ACCESS SYSTEM

BACKGROUND

Technical Field

The present invention relates to the field of storage, and in particular, to a data access system.

Related Art

In recent years, with the rapid advancement of data access systems, data access systems have been widely used in many applications in daily life, such as e-mail servers, financial transactions and database management. As data to be processed and services to be provided by the conventional data access systems continue to increase, the burden of operating the data access systems is also increasing. Therefore, how to reduce the downtime of the data access systems in multiplex high-speed processing, that is, to keep the high availability of the data access systems has become an important issue.

At present, since a data access system with dual controllers is limited in the architecture design of access right switching between the dual controllers or is limited by the bandwidth of a transmission interface between the dual controllers, the data access system is limited in operation speed and reduced in efficiency.

SUMMARY

In view of this, the present invention proposes a data access system.

According to some embodiments, a data access system includes: a data storage medium, a record medium, a first controller, and a second controller. The record medium includes a first record area and a second record area. The first controller includes a first metadata area. The second controller includes a second metadata area. The first controller is connected to the data storage medium and the record medium and corresponds to the first record area. The second controller is connected to the data storage medium and the record medium and corresponds to the second record area. The first controller receives first data, and writes the first data into the data storage medium in a log manner to update the first metadata area, and correspondingly generates a first record in the first record area. The second controller updates the second meta data area according to the first record in the first record area.

According to some embodiments, when checking that the occupied capacity of the first record in the first record area satisfies a threshold value, the second controller in the foregoing data access system updates the second metadata area according to the first record in the first record area.

According to some embodiments, when checking that the first record area is full, the first controller in the foregoing data access system triggers the second controller to update the second metadata area according to the first record in the first record area, and clears the first record area after confirming that the second controller completes update.

According to some embodiments, the second controller in the foregoing data access system receives second data, and writes the second data into the data storage medium in a log manner to update the second metadata area, and correspondingly generates a second record in the second record area, and the first controller updates the first metadata area according to the second record in the second record area.

According to some embodiments, when checking that the occupied capacity of the second record in the second record area satisfies a threshold value, the first controller in the foregoing data access system updates the first metadata area according to the second record in the second record area.

According to some embodiments, when checking that the second record area is full, the second controller in the foregoing data access system triggers the first controller to update the first metadata area according to the second record in the second record area, and clears the second record area after confirming that the first controller completes update.

According to some embodiments, the foregoing data access system further includes: a multipath I/O, connected to the first controller and the second controller. The first controller receives the first data via the multipath I/O, and the second controller receives the second data via the multipath I/O.

According to some embodiments, the first record in the foregoing data access system includes: a first time stamp for receiving the first data via the multipath I/O, a first location of the first data stored in the data storage medium, and a first capacity of the first data. The second record in the foregoing data access system includes: a second time stamp for receiving the second data via the multipath I/O, a second location of the second data stored in the data storage medium, and a second capacity of the second data.

According to some embodiments, the foregoing data access system further includes: a multipath I/O, connected to the first controller. The first controller receives the first data via the multipath I/O.

According to some embodiments, the first record in the foregoing data access system includes: a first time stamp for receiving the first data via the multipath I/O, a first location of the first data stored in the data storage medium, and a first capacity of the first data.

In summary, the data access system according to some embodiments of the present invention includes a first controller and a second controller. By means of a record in a record area, another controller may be allowed to update a metadata area accordingly, so that two controllers can synchronize the knowledge of data in a data storage medium. Therefore, the data access system neither needs to be limited by the transmission bandwidth between dual controllers, nor needs to rely on a mutual exclusion locking mechanism between the dual controllers, thereby allowing the data access system to achieve a high-speed access function controlled by the dual controllers.

DETAILED DESCRIPTION

Figure 1:
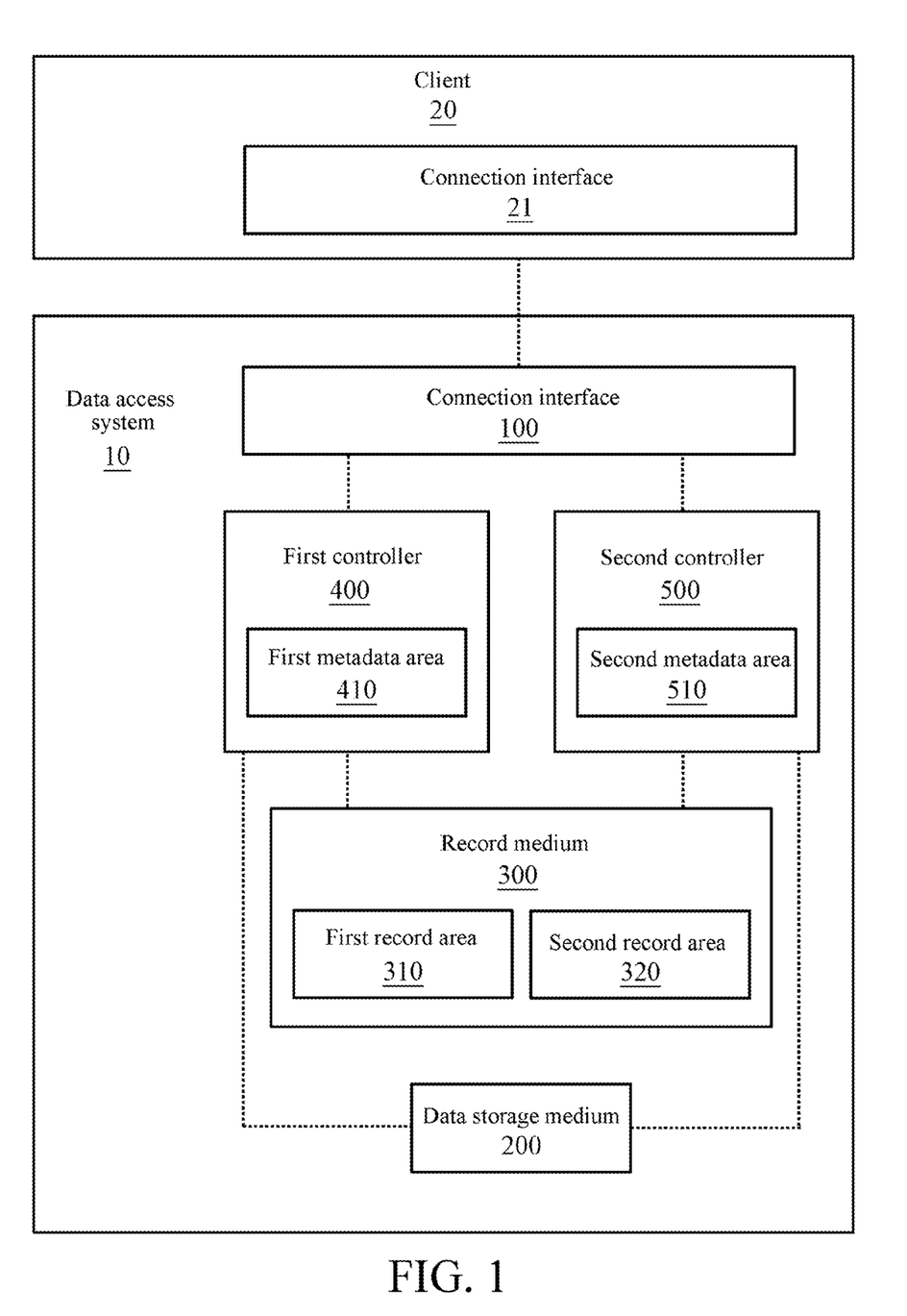
FIG. 1 is a schematic diagram of a data access system according to some embodiments of the present invention.

FIG. 1 is a schematic diagram of a data access system 10 according to an embodiment of the present invention. Referring to FIG. 1, the data access system 10 includes: a connection interface 100 with a multipath I/O (MPIO), a data storage medium 200, a record medium 300, a first controller 400, and a second controller 500. The record medium 300 includes a first record area 310 and a second record area 320, the first controller 400 includes a first metadata area 410, and the second controller 500 includes a second metadata area 510. The connection interface 100 is a network interface, and the connection interface 100 is connected to the first controller 400 and the second controller 500 such that the first controller 400 and the second controller 500 receive instructions of a user terminal and operate according to the instructions. The first controller 400 and the second controller 500 are respectively connected to the data storage medium 200 and the record medium 300 to access content stored in the data storage medium 200 and the record medium 300.

The data storage medium 200 and the record medium 300 are respectively, for example, but not limited to, non-volatile memories (NVM) with an access function such as an electrically-erasable programmable read-only memory (EE-PROM), a phase-change memory (PCM), a magnetoresistive random access memory (MRAM), a resistive random access memory (ReRAM), or a flash memory. In some other embodiments, the data storage medium 200 and the record medium 300 are respectively, for example, but not limited to, a hard disk drive (HDD), a solid-state drive (SSD), or a redundant array of independent disks (RAID), etc., wherein the redundant array of independent disks is not limited to being composed of a hard disk drive or a solid-state drive, or composed jointly of a hard disk drive and a solid-state drive. It should be particularly noted that, according to some embodiments, the data storage medium 200 is a redundant array of independent disks in a level of not less than RAID 4. The first metadata area 410 and the second metadata area 510 may be implemented by, for example, but not limited to, the non-volatile memory with an access function, the hard disk drive or the solid-state drive.

The data access system 10 stores data in the data storage medium 200 through the first controller 400 or/and the second controller 500. According to an operation mode of the data access system 10, the data is selectively to be stored into the data storage medium 200 only through the first controller 400, only through the second controller 500, or partially through the first controller 400 and partially through the second controller 500. Here, the data stored by the first controller 400 is defined as first data, and the data stored by the second controller 500 is defined as second data.

In some embodiments, the data access system 10 is adapted to connect at least one client 20 to execute a write instruction of the client 20 and store data provided by the client 20 into the data storage medium 200, or execute a read instruction of the client 20 and transmit the data in the data storage medium 200 to the client 20. The client 20 has a connection interface 21 corresponding to the connection interface 100 of the data access system 10.

The record medium 300 includes a first record area 310 and a second record area 320. The first record area 310 is used for the first controller 400 to store a record (hereinafter referred to as "first record") for performing writing and deleting on the data storage medium 200, where the first record is correspondingly generated when the first controller 400 writes data in a log manner. Similarly, the second record area 320 is used for the second controller 500 to store a record for performing writing and deleting on the data storage medium 200, where the second record is correspondingly generated when the second controller 500 writes data in the log manner. The writing of data in the log manner refers to: sequentially writing data to a physical address of the data storage medium 200, and generating a mapping relationship between the physical address and a logical address, as well as a valid value about whether the data is valid or invalid (for example, if an instruction for deleting the data is executed, the data is marked to be invalid). Please refer to U.S. Pat. No. 10,073,771 for details.

The first controller 400 is internally provided with a first metadata area 410 for storing a record about the foregoing mapping relationship between the physical address and the logical address and a corresponding valid value (hereinafter simply referred to as "mapping table"). Similarly, the second controller 500 is internally provided with a second metadata area 510 for storing a record about the foregoing mapping relationship between the physical address and the logical address and a corresponding valid value (i.e., mapping table).

In some embodiments, the first metadata area 410 and the second metadata area 510 are stored in the data storage medium 200. In some embodiments, the first metadata area 410 and the second metadata area 510 are stored in the record medium 300.

In some embodiments, the data access system 10 is adapted to operate in a dual-active mode and a single-active mode. The first controller 400 and the second controller 500 are adapted to operate in an active state or a standby state. When a controller (i.e., first controller 400 or second controller 500) is in the active state, the controller can receive data and write the data into the data storage medium 200, and can check a record area corresponding to another controller to obtain a write condition of another controller and update its own metadata area accordingly. For example, when the first controller 400 operates in the active state, the data can be received and written into the data storage medium 200, and the first metadata area 410 can be updated according to the second record area 320 corresponding to the second controller 500. When the controller is in the standby state, the controller cannot write data into the data storage medium 200, but can check a record area of another controller to obtain a write condition of another controller and update its own metadata area accordingly. For example, when the second controller 500 operates in the standby state, the second metadata area 510 can be updated according to the first record area 310 corresponding to the first controller 400. When the data access system 10 operates in the dual-active mode, both the first controller 400 and the second controller 500 operate in the active state. On the contrary, when the data access system 10 operates in the single-active mode, one of the first controller 400 and the second controller 500 operates in the active state, and the other one of the first controller 400 and the second controller 500 operates in the standby state.

Figure 2:
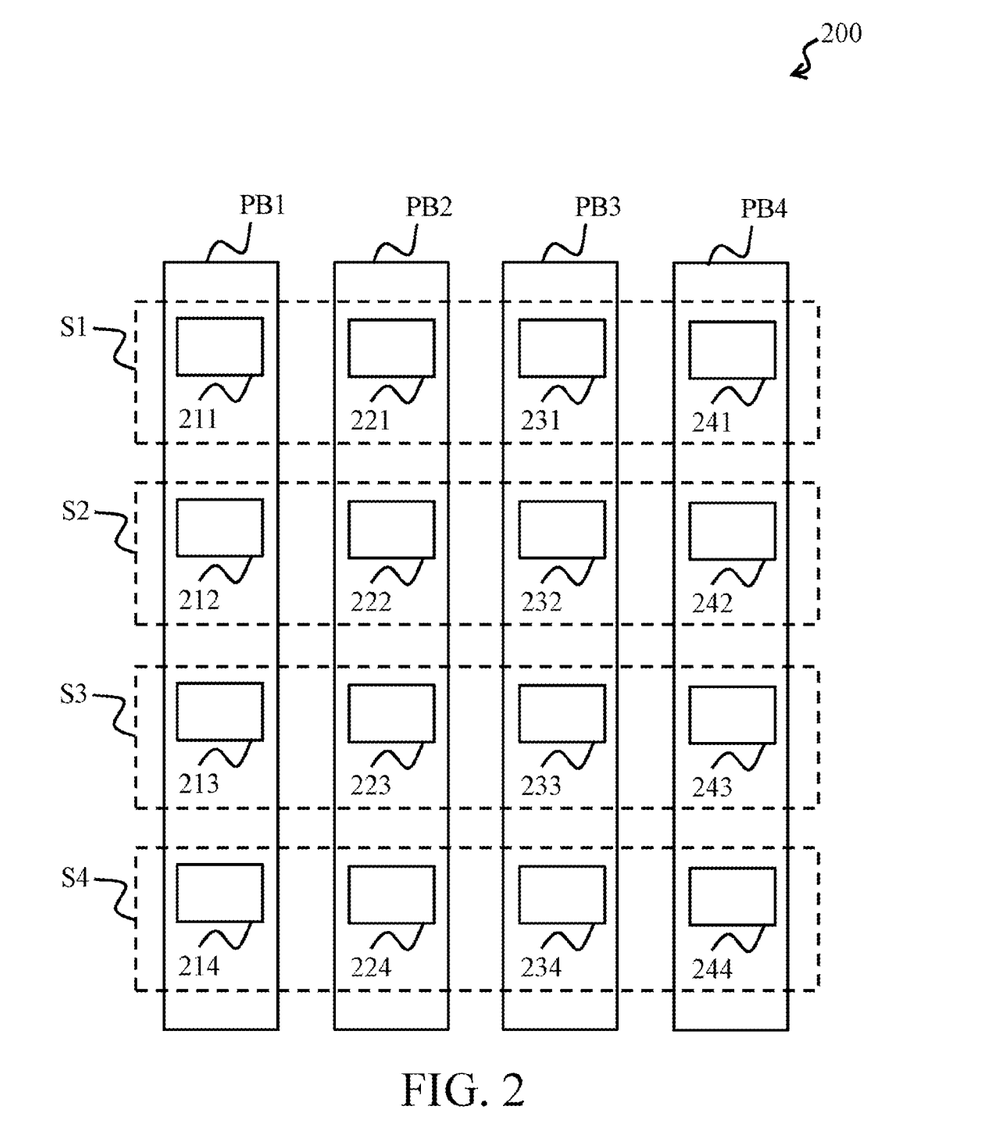
FIG. 2 is a schematic diagram of a data storage medium according to some embodiments of the present invention.

FIG. 2 is a schematic diagram of a data storage medium 200 according to some embodiments of the present invention. Referring to FIG. 2, in some embodiments, the data storage medium 200 is a redundant array of independent disks (RAID). The data storage medium 200 includes a plurality of physical blocks (PB) PB1, PB2, PB3, and PB4, and a plurality of stripes S1, S2, S3, and S4, but the present invention is not limited thereto. The number of physical blocks and stripes may be increased or decreased according to the actual needs of the data storage medium 200.

The stripes S1-S4 respectively span the physical blocks PB1-PB4. Specifically, the areas of the stripes S1-S4 spanning the physical blocks PB1-PB4 include a plurality of pages. Various pages of the stripe S1 correspond to the physical blocks PB1-PB4 are respectively a page 211, a page 221, a page 231, and a page 241. Various pages of the stripe S2 correspond to the physical blocks PB1-PB4 are respectively a page 212, a page 222, a page 232, and a page 242. Various pages of the stripe S3 correspond to the physical blocks PB1-PB4 are respectively a page 213, a page 223, a page 233, and a page 243. Various pages of the stripe S4 correspond to the physical blocks PB1-PB4 are respectively a page 214, a page 224, a page 234, and a page 244.

Referring to FIG. 1 and FIG. 2 simultaneously, in some embodiments, the pages 211 to 214, 221 to 224, 231 to 234, and 241 to 244 are used for storing data and corresponding error control codes (ECC). In some embodiments, the first controller 400 may be capable of receiving data to be written (i.e., one or more first data), and the first controller 400 stores the first data into the pages 211 to 214, 221 to 224, 231 to 234, and 241 to 244 respectively. Moreover, the first controller 400 stores the error control codes corresponding to the first data into the pages 211 to 214, 221 to 224, 231 to 234, and 241 to 244. Similarly, in some embodiments, the second controller 500 may be capable of receiving data to be written (i.e., one or more second data), and the second controller 500 stores the second data into the pages 211 to 214, 221 to 224, 231 to 234, and 241 to 244 respectively. Moreover, the second controller 500 stores the error control codes corresponding to the second data into the pages 211 to 214, 221 to 224, 231 to 234, and 241 to 244.

In some embodiments, when any one of the physical blocks PB1 to PB4 is faulty, the data storage medium 200 may perform debugging by parity check via the error control codes, and the data storage medium 200 further restores the data stored in the faulty physical block via the data and error control codes of other fault-free physical blocks in the same stripe.

It should be particularly noted that, according to some embodiments, the first controller 400 and the second controller 500 do not simultaneously write the same stripe, for example, when the first controller 400 is storing the first data in the stripe S 1, the second controller 500 does not store the second data in the stripe S1. Therefore, the first controller 400 and the second controller 500 do not collide when executed. In some embodiments, the data access system 10 can control a location where the first controller 400 and the second controller 500 write into the data storage medium 200, thereby preventing the first controller 400 and the second controller 500 from simultaneously writing the same stripe. According to some embodiments, the data access system 10 prevents the first controller 400 and the second controller 500 from simultaneously writing the same stripe via an instruction of a coordination controller (not shown). The coordination controller is connected to the first controller 400 and the second controller 500 to transmit a coordination instruction to the first controller 400 and the second controller 500, and allocates respective written stripes corresponding to the first controller 400 and the second controller 500 via the coordination instruction. In some embodiments, the first controller 400 or the second controller 500 allocates respective written stripes corresponding to the present controller and the other controller.

Figure 3:
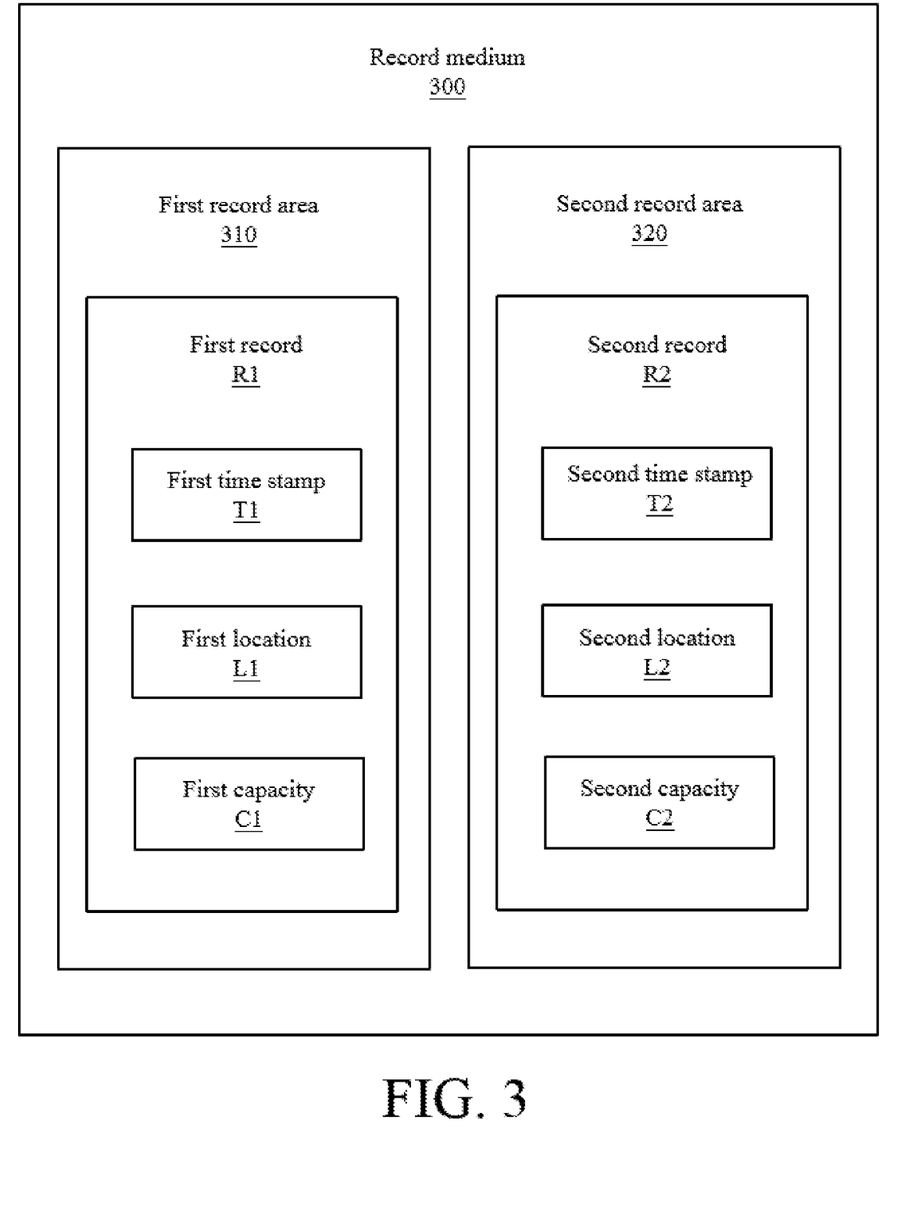
FIG. 3 is a schematic diagram of a record medium according to some embodiments of the present invention.

FIG. 3 is a schematic diagram of a record medium 300 according to some embodiments of the present invention. Referring to FIG. 1 and FIG. 3, in some embodiments, a first controller 400 operating in an active state writes first data into a data storage medium 200 in a log manner to update a first metadata area 410, and correspondingly generates a first record R1 in a first record area 310. That is, when the first controller 400 writes first data in a log manner, the first data will be sequentially written into a physical address of the data storage medium 200, and records a relationship between the physical address and a logical address and a corresponding valid value in a mapping table. Moreover, the first record R1 is made according to changed content, and the content of the first record R1 will be described later. In order to know the latest state of the content stored in the data storage medium 200, the second controller 500 updates a second metadata area 510 according to the first record R1 in the first record area 310. The "update" is to add the mapping relationship and the valid value (i.e., mapping table) corresponding to operations such as writing and deleting performed by the first controller 400 to the second metadata area 510. Thus, the second controller 500 does not need to additionally communicate with a transmission channel of the first controller 400, and does not need to rely on a mutual exclusion locking mechanism between two controllers, so that the second controller 500 can obtain related write information of the first controller 400. Similarly, for the writing, deleting and other actions performed by the second controller 500, the first controller 400 can also update the first metadata area 410 via a second record R2 in a second record area 320.

Referring to FIG. 3, in some embodiments, the first record R1 includes: a first time stamp T1, a first location L 1 and a first capacity C 1. The first time stamp T1 is a time stamp in which a connection interface 100 with a multipath I/O receives first data. The first location L1 is, for example, but not limited to, a physical address, a logical address, or a combination of a physical address and a logical address of a page of the first data stored in the data storage medium 200. The first capacity C1 is a data size of the first data. The connection interface 100 generates a corresponding first time stamp T1 according to a time point at which the first data is transmitted via the connection interface 100 with the multipath I/O. According to some other embodiments, the first time stamp T1 is a time point at which the first data is output to the first controller 400 via the connection interface 100. Similarly, in some embodiments, the second record R2 includes: a second time stamp T2, a second location L2 and a second capacity C2. The second time stamp T2 is a time stamp in which the connection interface 100 with a multipath I/O receives second data. The second location L2 is, for example, but not limited to, a physical address, a logical address, or a combination of a physical address and a logical address of a page of the second data stored in the data storage medium 200. The second capacity C2 is a data size of the second data. According to some other embodiments, the second time stamp T2 is a time point at which the second data is output to the second controller 500 via the connection interface 100.

In some embodiments, when a controller (e.g., second controller 500) checks that the occupied capacity of the first record R1 in a record area (first record area 310 here) of another controller (e.g., first controller 400) satisfies a threshold value (e.g., specific capacity), the second metadata area 510 is updated (updated according to the first record R1 of the first record area 310 here). That is to say, the controller checks the record area of another controller and performs update when the data change content reaches a certain level. In some embodiments, the threshold value corresponding to the occupied capacity of the first record R1 is different from the threshold value corresponding to the occupied capacity of the second record R2.

In some embodiments, the controller (e.g., first controller 400) checks whether its own record area (first record area 310 here) is full, and if so, another controller (second controller 500 here) is triggered to perform update according to the first record R1 in the first record area 310 (the second metadata area 510 is updated here). Moreover, after the controller (first controller 400 here) confirms that the update is completed (i.e., the second metadata area 510 is updated here), a record (first record R1 here) in the record area is cleared.

Table 1 is an example of a data storage medium 200 storing data in some embodiments of the present invention. Table 2 is an example of a first record area 310 storing a record in some embodiments of the present invention. Table 3 is an example of a second record area 320 not storing a record in some embodiments of the present invention. Table 4 is an example of a first controller 400 and a second controller 500 determining a data storage sequence in a data storage medium 200 according to a record in a record medium 300 in some embodiments of the present invention. Tables 1 to 4 are as follows:

TABLE 1

| | Data storage medium 200 | | | | | | | |
|---|---|---|---|---|---|---|---|---|
| | Physical block PB1 | Physical block PB2 | Physical block PB3 | Physical block PB4 | Physical block PB5 | Physical block PB6 | Physical block PB7 | Physical block PB8 |
| Stripe S1 | D1 | D2 | D3 | D4 | D5 | D6 | D7 | P1 |
| Stripe S2 | D3 | D8 | D9 | D5 | D10 | D4 | D7 | P2 |
| Stripe S3 | | | | | | | | |
| Stripe S4 | | | | | | | | |

TABLE 2

| First record area 310 | | |
|---|---|---|
| First time stamp T1 | First location L1 | First capacity C1 |
| 1 | (S1, PB1) | d1 |
| 2 | (S1, PB2) | d2 |
| 3 | (S1, PB3) | d3 |
| 4 | (S1, PB4) | d4 |
| 5 | (S1, PB5) | d5 |
| 6 | (S1, PB6) | d6 |
| 7 | (S1, PB7) | d7 |
| 8 | (S2, PB1) | d3 |
| 9 | (S2, PB2) | d8 |
| 10 | (S2, PB3) | d9 |
| 11 | (S2, PB4) | d5 |
| 12 | (S2, PB5) | d10 |
| 13 | (S2, PB6) | d4 |
| 14 | (S2, PB7) | d7 |
| . | . | . |
| . | . | . |
| . | . | . |

TABLE 3

| Second record area 320 | | |
|---|---|---|
| Second time stamp T2 | Second location L2 | Second capacity C2 |
| . | . | . |
| . | . | . |
| . | . | . |

TABLE 4

| | Data storage medium 200 | | | | | | | |
|---|---|---|---|---|---|---|---|---|
| | Physical block PB1 | Physical block PB2 | Physical block PB3 | Physical block PB4 | Physical block PB5 | Physical block PB6 | Physical block PB7 | Physical block PB8 |
| Stripe S1 | D1 | D2 | D3-old | D4-old | D5-old | D6 | D7-old | P1 |
| Stripe S2 | D3-new | D8 | D9 | D5-new | D10 | D4-new | D7-new | P2 |
| Stripe S3 | | | | | | | | |
| Stripe S4 | | | | | | | | |

Referring to FIG. 1 and Table 1 to Table 4, in some embodiments, the data storage medium 200 is a fourth-level redundant array of independent disks, there are four stripes S1-S4 and eight physical blocks PB1-PB8, and the physical block PB8 is used to store an error control code. It is assumed that the data storage medium 200 and the record medium 300 have not previously stored data or records. The first controller 400 operates in an active state. The second controller 500 is not limited to operating in an active state or a standby state.

Hence, the data access system 10 sequentially writes fourteen first data into the data storage medium 200 via the first controller 400 (in accordance with a writing sequence: D1, D2, D3, D4, D5, D6, D7, D3, D8, D9, D5, D10, D4, and D7), the first seven first data being written into the stripe S1, and the last seven first data being written into the stripe S2. Therefore, the first data stored in the data storage medium 200 is as shown in Table 1, wherein an error control code P1 and an error control code P2 are error control codes corresponding to the stripe S1 and the stripe S2, respectively.

The first record R1 correspondingly generated by writing the first data into the data storage medium 200 via the first controller 400 in a log manner is as shown in Table 2. The first record area 310 stores a first time stamp T1, a first location L1 and a first capacity C1. The first time stamp T1 is exemplified by "1-14". As the value of the first time stamp T1 is larger, newer data is indicated. The first location L1 is exemplified by "(S1, PB1)", and represents a page corresponding to the stripe S1 and the physical block PB1. The first capacity C1 is exemplified by "d1", which stores the data size of the first data D1.

Moreover, since the second controller 500 does not write data into the data storage medium 200, the second record R2 is as shown in Table 3, and the second record area 320 does not store a record.

When the second controller 500 reads the first record area 310, the second controller 500 can obtain related information indicating that the first controller 400 writes the first data into the data storage medium 200 in a log manner (as shown in Table 2), and can determine a data storage sequence in the data storage medium 200 (as shown in Table 4). "D3-old" and "D3-new" are used as examples. "D3-old" and "D3-new" are stored in different pages in the data storage medium 200, respectively. But "D3-old" and "D3-new" are data "D3" stored into the data storage medium 200 at different time points, wherein "D3-old" represents data stored at an earlier time point, and "D3-new" represents data stored at a later time point. In some embodiments, the data stored at an earlier time point is invalid data which can be erased as garbage data. The data stored at a later time point is valid data, that is, valid data when the data access system 10 reads.

Moreover, the process in which the second controller 500 reads the first record R1 in the first record area 310 to update the second metadata area 510 is exemplified by Table 1 to Table 4. The second controller 500 obtains a sequence in which the first data is written into the data storage medium 200 according to the first time stamp T1. Therefore, in the present embodiment, update begins from data with a first time stamp T1 being "1" to data with a first time stamp T1 being "14" according to the size sequence of the first time stamp T1. The second controller 500 obtains location information of the first data stored in the data storage medium 200 by using the first location L 1. As described above, the location information may be, according to different embodiments, a physical address, a logical address, or a combination of a physical address and a logical address of the first data stored in the data storage medium 200. By means of the location information, the second controller 500 may restore a mapping table of the first controller 400 writing the first data into the data storage medium 200, and update the second metadata area 510 with the mapping table. In some embodiments, the second controller 500 needs to obtain the data size of the first data through the first capacity C1, and by means of information about the data size of the first data, the second controller 500 can perform the foregoing operation of restoring a mapping table of the first controller 400 writing the first data into the data storage medium 200. In some embodiments, during the operation process between the physical address and the logical address, correct location information can be obtained in combination with the information about the data size.

Moreover, when the first controller 400 writes the first data into the data storage medium 200 in a log manner, the first controller 400 updates the first metadata area 410. Therefore, the first controller 400 can determine the data storage sequence in the data storage medium 200 by means of the first metadata area 410.

Table 5 is an example of a data storage medium 200 storing data in some embodiments of the present invention. Table 6 is an example of a first record area 310 storing a record in some embodiments of the present invention. Table 7 is an example of a second record area 320 storing a record in some embodiments of the present invention. Table 8 is an example of a first controller 400 and a second controller 500 determining a data storage sequence in a data storage medium 200 according to a record in a record medium 300 in some embodiments of the present invention. Tables 5 to 8 are as follows:

TABLE 5

Data storage medium 200

|  | Physical block PB1 | Physical block PB2 | Physical block PB3 | Physical block PB4 | Physical block PB5 | Physical block PB6 | Physical block PB7 | Physical block PB8 |
| --- | --- | --- | --- | --- | --- | --- | --- | --- |
| Stripe S1 | D1 | D2 | D4 | D5 | D6 | D7 | D8 | P1 |
| Stripe S2 |  |  |  |  |  |  |  |  |
| Stripe S3 | D3 | D5 | D6 | D7 | D8 |  |  | P3 |
| Stripe S4 |  |  |  |  |  |  |  |  |

TABLE 6

First record area 310

| First time stamp T1 | First location L1 | First capacity C1 |
| --- | --- | --- |
| 1 | (S1, PB1) | d1 |
| 2 | (S1, PB2) | d2 |
| 4 | (S1, PB3) | d4 |
| 5 | (S1, PB4) | d5 |
| 8 | (S1, PB5) | d6 |
| 10 | (S1, PB6) | d7 |
| 11 | (S1, PB7) | d8 |
| . | . | . |
| . | . | . |
| . | . | . |

TABLE 7

Second record area 320

| Second time stamp T2 | Second location L2 | Second capacity C2 |
| --- | --- | --- |
| 3 | (S3, PB1) | d3 |
| 6 | (S3, PB2) | d5 |
| 7 | (S3, PB3) | d6 |
| 9 | (S3, PB4) | d7 |
| 12 | (S3, PB5) | d8 |
| . | . | . |
| . | . | . |
| . | . | . |

TABLE 8

| | Data storage medium 200 | | | | | | | |
|---|---|---|---|---|---|---|---|---|
| | Physical block PB1 | Physical block PB2 | Physical block PB3 | Physical block PB4 | Physical block PB5 | Physical block PB6 | Physical block PB7 | Physical block PB8 |
| Stripe S1 | D1 | D2 | D4 | D5-old | D6-new | D7-new | D8-old | P1 |
| Stripe S2 | | | | | | | | |
| Stripe S3 | D3 | D5-new | D6-old | D7-old | D8-new | | | P3 |
| Stripe S4 | | | | | | | | |

Referring to FIG. 1 and Table 5 to Table 8, in some embodiments, the data storage medium 200 is a fourth-level redundant array of independent disks, there are four stripes S1-S4 and eight physical blocks PB1-PB8, and the physical block PB8 is used to store an error control code. It is assumed that the data storage medium 200 and the record medium 300 have not previously stored data or records. Both the first controller 400 and the second controller 500 operate in an active state.

Hence, the data access system 10 sequentially writes seven first data into the data storage medium 200 via the first controller 400 (in accordance with a writing sequence: D1, D2, D4, D5, D6, D7, and D8), and the data access system 10 also sequentially writes five second data into the data storage medium 200 via the second controller 500 (in accordance with a writing sequence: D3, D5, D6, D7, and D8). The seven first data are written into the stripe S1, and the five second data are written into the stripe S3. Therefore, the first data and the second data stored in the data storage medium 200 are as shown in Table 5, wherein an error control code P1 and an error control code P3 are error control codes corresponding to the stripe S1 and the stripe S3, respectively.

The first record R1 in the first record area 310 is as shown in Table 6, and the second record R2 in the second record area 320 is as shown in Table 7, wherein the corresponding record is similar to the foregoing description of Table 2 and will not be repeated here. It should be particularly noted that, for the first time stamp T1 (in a sequence of 1, 2, 4, 5, 8, 10, and 11) in Table 6 and the second time stamp T2 (in a sequence of 3, 6, 7, 9, and 12) in Table 7, since the first time stamp T1 and the second time stamp T2 are both generated when the connection interface 100 with a multipath I/O is in the same transmission phase, the values represented by the first time stamp T1 and the second time stamp T2 can be compared with each other, and as the value is larger, newer data is indicated.

Therefore, when the first controller 400 reads the second record area 320, the first controller 400 can determine the data storage sequence in the data storage medium 200 by means of the records of the first metadata area 410 and the second record area 320, as shown in Table 8. Similarly, when the second controller 500 reads the first record area 310, the second controller 500 can determine the data storage sequence in the data storage medium 200 by means of the records of the second metadata area 510 and the first record area 310, as shown in Table 8.

In summary, the data access system according to some embodiments of the present invention includes a first controller and a second controller. By means of a record in a record area, another controller may be allowed to update a metadata area accordingly, so that two controllers can synchronize the knowledge of data in a data storage medium. Therefore, the data access system neither needs to be limited by the transmission bandwidth between dual controllers, nor needs to rely on a mutual exclusion locking mechanism between the dual controllers, thereby allowing the data access system to achieve a high-speed access function controlled by the dual controllers.

What is claimed is:

1. A data access system, comprising:
    a data storage medium;
    a record medium, comprising a first record area and a second record area;
    a first controller, connected to the data storage medium and the record medium, and corresponding to the first record area, the first controller comprising a first metadata area; and
    a second controller, connected to the data storage medium and the record medium, and corresponding to the second record area, the second controller comprising a second metadata area;
    wherein the first controller receives first data, and writes the first data into the data storage medium in a log manner to update the first metadata area, and correspondingly generates a first record in the first record area, and the second controller updates the second metadata area according to the first record in the first record area;
    wherein when checking that an occupied capacity of the first record in the first record area satisfies a threshold value, the second controller updates the second metadata area according to the first record in the first record area;
    the second controller receives second data, and writes the second data into the data storage medium in a log manner to update the second metadata area, and correspondingly generates a second record in the second record area, and the first controller updates the first metadata area according to the second record in the second record area;
    when checking that an occupied capacity of the second record in the second record area satisfies another threshold value, the first controller updates the first metadata area according to the second record in the second record area;
    the threshold value corresponding to the occupied capacity of the first record is different from the threshold value corresponding to the occupied capacity of the second record.

2. The data access system according to claim 1, wherein when checking that the first record area is full, the first controller triggers the second controller to update the second metadata area according to the first record in the first record area, and clears the first record area after confirming that the second controller completes update.

3. The data access system according to claim 1, wherein when checking that the second record area is full, the second controller triggers the first controller to update the first metadata area according to the second record in the second record area, and clears the second record area after confirming that the first controller completes update.

4. The data access system according to claim 1, further comprising: a multipath I/O, connected to the first controller and the second controller, the first controller receives the first data via the multipath I/O, and the second controller receives the second data via the multipath I/O.

5. The data access system according to claim 4, wherein the first record comprises: a first time stamp for receiving the first data via the multipath I/O, a first location of the first data stored in the data storage medium, and a first capacity of the first data; and the second record comprises: a second time stamp for receiving the second data via the multipath I/O, a second location of the second data stored in the data storage medium, and a second capacity of the second data.

6. The data access system according to claim 1, further comprising: a multipath I/O, connected to the first controller, the first controller receives the first data via the multipath I/O.

7. The data access system according to claim 6, wherein the first record comprises: a first time stamp for receiving the first data via the multipath I/O, a first location of the first data stored in the data storage medium, and a first capacity of the first data.

* * * * *